United States Patent Office
3,237,279
Patented Mar. 1, 1966

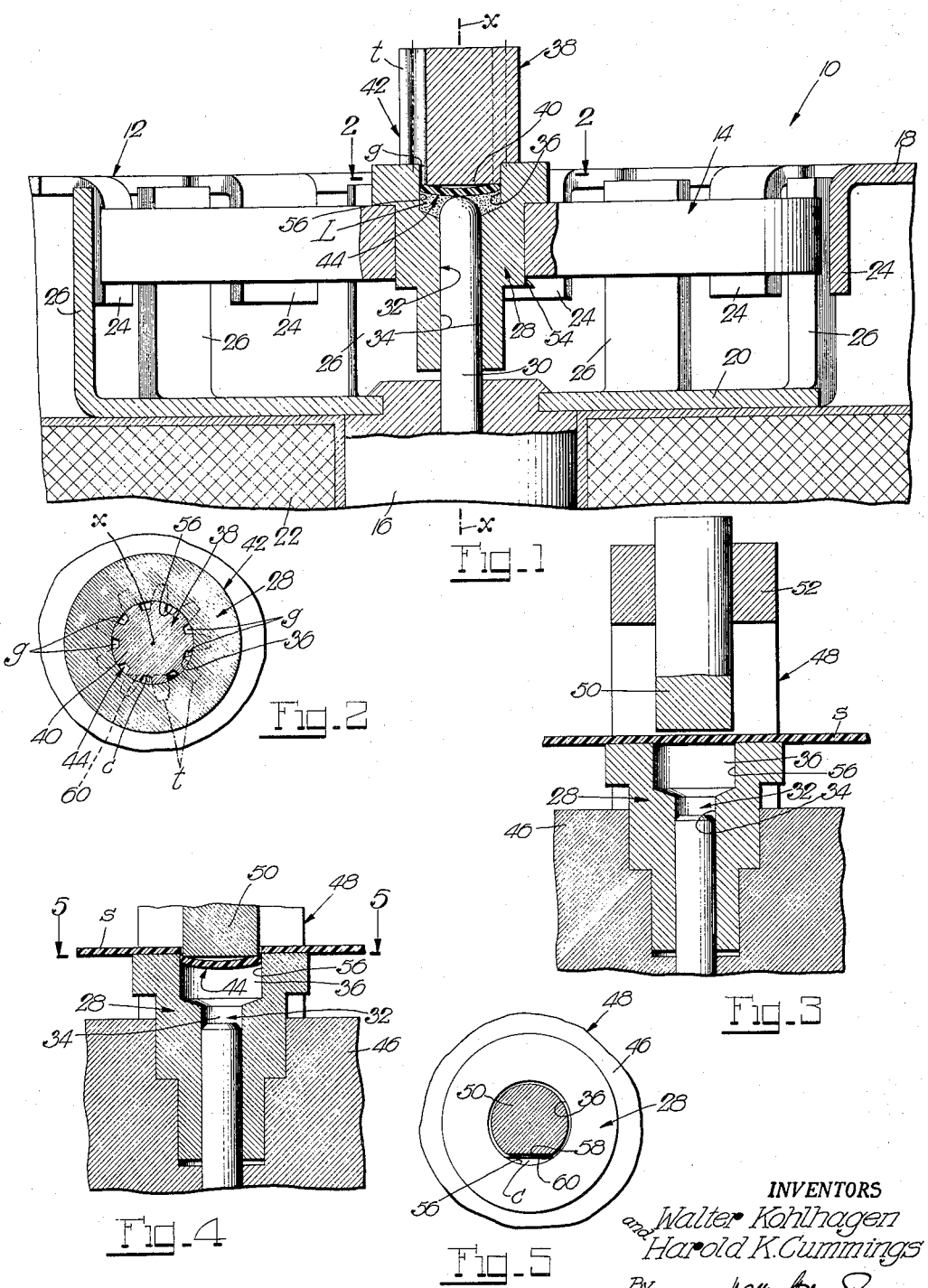

3,237,279
METHOD OF PROVIDING SMALL DRIVE UNITS WITH THRUST BEARINGS
Walter Kohlhagen, Elgin, Ill., and Harold K. Cummings, Whitewater, Wis., assignors to Amphenol-Borg Electronics Corporation, Broadview, Ill., a corporation of Delaware
Filed Mar. 17, 1964, Ser. No. 352,551
6 Claims. (Cl. 29—149.5)

This invention relates to drive units in general, and to a method of making improved thrust bearings and applying them to small drive units in particular.

The present invention pertains to small drive units especially, though not exclusively, of synchronous motor type, having coaxial elements with interfitted hub and recess formations which constitute drive components that are journalled on fixed shaft stubs usually with some freedom for operational endshake. One of the elements of such drive components is customarily provided with an axial aperture which is received with a journal fit on a shaft stub and is continuous with a recess formation a part of which usually serves as a lifetime lubricant reservoir for the bearing arrangement, with the hub of the other element being customarily pressfitted in the remaining part of the recess formation and serving as the thrust bearing of the drive component. While these drive components perform in general satisfactorily and meet the requirements of structural simplicity and low cost of small mass-produced drive units, they are deficient in a few, though important respects. Thus, the elements of the drive components and the shaft stubs are in many instances required to be of metal, wherefore the thrust bearings of these drive components and the shaft stubs encounter considerable operational friction on each other and, hence, are not only subject to fairly rapid wear but also produce some operational noise. Moreover, operational friction and wear of these parts have a deteriorating effect on the lifetime lubricant supply with ensuing possible operational malfunctioning or even failure of the drive units by virtue of all too ready tightening or even binding of the drive components on their shaft stubs at degrading lubrication, especially since the available driving torque of these units, such as synchronous motors, for example, is of low magnitude.

To eliminate these functional weaknesses of small drive units, recourse is had in many instances to thrust washers of low-friction bearing materials, such as nylon, for example, which surround the shaft stubs and react with the drive components to take up operational thrust. However, these thrust washers, being necessarily of considerably larger size than the shaft stubs in order to cooperate with the drive components, are subject to considerable wear and also entail other disadvantages. In view of this, attempts have been made to provide the drive units with thrust discs which react with the shaft stubs, rather than with the drive components, in taking up operational thrust, but these attempts have been abandoned almost immediately owing to the small sizes involved of such discs. Thus, it has been found that manual handling of blanked discs of the exceedingly small sizes involved required such dexterity and was so time-consuming, not only in their mere grasping but also in their insertion in the drive components, as to render this expediency entirely impractical owing to its prohibitive cost.

It is among the objects of the present invention to provide small drive units with the aforementioned thrust discs at a cost which is no more, and may even be less, than the cost of such units with the aforementioned thrust washers.

It is another object of the present invention to provide small drive units with the aforementioned thrust discs in a manner which requires no manual handling of these discs whatsoever, thereby eliminating the very cause which heretofore rendered their provision in such drives entirely impractical.

It is a further object of the present invention to devise a method of applying the aforementioned thrust discs to small drive units, which features resorting to the recess formations in the one elements of the drive components as the female or die part of a disc-blanking die and punch set, thereby blanking the thrust discs directly into as yet non-assembled elements of the drive components and thus achieving elimination of any manual handling of these thrust discs from their blanking to their insertion in the designated elements of the drive components, with final correct location of these thrust discs in the respective elements being additionally achieved on mere assembly of the elements of the drive components and subsequent placement of the latter on their shaft stubs.

Another object of the present invention is to form the aforementioned thrust discs in the lubricant-reservoir forming recesses in the one elements of the drive components so that they permit advantageous breathing of the lubricant reservoirs through vents provided for that purpose in the other elements of the drive components, by using for the aforemenetioned direct blanking of the thrust discs into the recesses in the respective elements of the drive components a punch which in its cross-sectional shape so deviates from that of these recesses that it will on the one hand, cooperate with the latter in blanking the thrust discs, and on the other hand will leave these thrust discs with suffiicent, preferably local, clearance from the peripheral wall of the lubricant-reservoir recesses to permit the intended breathing of the latter.

A further object of the present invention is to impart to the aforementioned thrust discs advantageous concavity in the course of their blanking directly into the one element of the drive components, by using for the blanking of the discs a punch which in its cross-sectional dimension is sufficiently smaller than that of the die-serving recesses in the elements to compel the discs into the desired concave configuration.

Other objects and advantages will appear to those skilled in the art from the following, considered in conjunction with the accompanying drawings.

In the accompanying drawings, in which certain modes of carrying out the present invention are shown for illustrative purposes:

FIG. 1 is an enlarged fragmentary section through a small drive unit with a thrust bearing according to the present invention;

FIG. 2 is a fragmentary section through the drive unit on the line 2—2 of FIG. 1;

FIG. 3 and 4 are fragmentary sections through a tool showing progressive steps in the blanking of thrust bearings and their assembly with small drive units according to a method of the present invention; and FIG. 5 is a section taken on the line 5—5 of FIG. 4.

Referring to the drawings, and more particularly to FIGS. 1 and 2 thereof, the reference numeral 10 designates a drive unit which is in the exemplary form of a synchronous reaction motor having a field structure 12 and a rotor 14. The field structure 12 has the usual field cup (not shown) with a ferromagnetic center core 16, and outer and inner field plates 18 and 20 secured in any suitable manner to the field cup and to the core 16, respectively, as well as a field coil 2 surrounding the core 16. The field plates 18 and 20 are formed with sets of field poles 24 and 26, respectively, which are arranged circularly about the rotor axis x and of which successive poles of one set alternate with successive poles of the other set.

The rotor 14, which is of permanent-magnet type and has on its periphery pole faces of opposite polarities, is carried by a bushing element 28 which is preferably of metal and is journalled on a fixed shaft stub 30 on the core 16. The bushing 28 is to this end provided with a through-passage 32 in the form of an aperture 34 and continuing enlarged end recess 36, of which the aperture 34 serves for the journal support of the bushing on the shaft stub 30 and the recess 36 serves in this instance as a reservoir for a lifetime supply of lubricant L. The bushing 28 also carries a coaxial element 38 in the form of a pinion for the transmission of the rotor torque to a utility device either directly or through reduction gearing. The pinion 38 is mounted on the bushing 28 by having a hub-like formation 40 secured, preferably by a pressfit, in an end length of the recess 36. The rotor-carrying bushing 28 and the pinion 38 thus form a drive component 42 of the exemplary motor drive unit 10. In operation of the motor, i.e., when the field coil 22 is supplied with alternating current, the field poles 24 and 26 have opposite polarities which change with the alternation of the current, and the rotor 14 steps in well-known manner in synchronism with the alternation of the current.

The drive component 42 of the exemplary drive unit 10 is also provided with a thrust bearing 44 which is in the form of a disc. This thrust disc 44 is, in accordance with the present invention, blanked from any suitable sheet bearing stock, such as nylon, for example, directly into the bushing element 28 prior to its assembly with the other, pinion, element 38 of the drive component 42. To this end, recourse is had to the bushing element 28 itself to serve as the die component of a punch and die set for blanking the thrust disc 44 from sheet bearing stock s. Thus, and as shown in FIG. 3, the bushing 28 is inserted in the base 46 of a jig 48 for location therein coaxially with a punch 50 which is guided for reciprocation in an overhanging head 52 of the jig. Sheet bearing stock s is then placed on the exposed end of the bushing 28 in covering relation with the end recess 36 in the bushing, whereupon the punch 50 is by any suitable means, such as a hammer, for instance, driven through the stock s and part-way into the recess 36 in the bushing (FIG. 4), whereby the punch cooperates with the recess 36 in blanking the thrust disc 44 from the stock s directly into the bushing. On retracting the punch from the bushing and removing the latter from the jig, the bushing is readily assembled with the rotor 14 and also with the pinion element 38, with the bushing being conveniently staked to the rotor 14 as at 54 (FIG. 1) and the pinion 38 being with its hub formation 40 simply driven into the recess 36 in the bushing.

With the recess 36 in the bushing 28 serving preferably as a reservoir for lubricant, the recess 36 is advantageously vented past the thrust disc 44 therein and through the gaps g between the pinion teeth t which in this instance extend into and throughout the axial extent of the hub formation 40 of the pinion. To the end of thus venting the lubricant reservoir, the thrust disc 44 is, in accordance with a further aspect of the present invention, blanked so as to have local clearance c from the peripheral wall 56 of the recess 36 in the bushing. Thus, the punch 50 is of a cross-section which in part conforms to, and in part deviates from, that of the recess 36 (FIG. 5), with the punch deviating from the cross-section of the recess by having in this instance a flat 58 which cooperates with the recess 36 in blanking the thrust disc 44 with the lopped-like side 60 at which the disc has the clearance c from the wall 56 of the recess 36 (FIGS. 2 and 5).

Blanking of the thrust disc directly into the bushing element 28 of the drive component 42 is particularly advantageous when the drive component is of such small size that preblanked thrust discs would be difficult to pick up and insert in the bushing element. Thus, to give an example in this connection and without intending any limitation, nylon thrust discs have been blanked entirely satisfactorily directly into rotor bushings such as shown and with the recess 36 being .075" in diameter, and these thrust discs have on removal from the bushings been found to be very difficult to pick up and insert back into the bushings. Of course, blanking thrust discs directly into one of the elements of a drive component is by no means limited to elements of the small recess size given in the above example, and may obviously be extended to elements of considerably larger recess size with the great advantage of entirely eliminating handling of the thrust discs from their blanking to their insertion into the elements. Moreover, and as in the case of the exemplary drive component 42 (FIG. 1), the thrust disc is even accurately located in its recess on mere placement of the assembled component on its shaft stub in complete journal support relation therewith. Thus, if on assembly of the elements 28, 38 of the drive component 42 (FIG. 1) the thrust disc 44 should be spaced from the hub formation 40 of the pinion element 38, the thrust disc will be located in proper position, i.e., in abutment with the hub formation 40, if not on forcing lubricant through the aperture 34 of the element 28 into the recess 36, then certainly on placing the assembled drive component onto its shaft stub 30 (FIG. 1).

In accordance with another aspect of the present invention, the thrust disc 44 is blanked directly into the bushing element 28 in such fashion that it has pronounced concavity at its punch-confronting side and, hence, convexity at its thrust side (FIG. 4), with the advantage that the contact area between the shaft stub and the thrust disc and, hence, operational friction between the latter, are kept at a minimum and their contact area is, moreover, generously lubricated at all times especially if the thrust end of the shaft stub is rounded as shown (FIG. 1). To thus blank the thrust disc with its concavity, the diameter of the punch is kept sufficiently smaller than the diameter of the recess 36 in the bushing element as shown in FIG. 4, with the difference in their diameters being kept within readily determinable limits within which the punch and the recess in the bushing element will cooperate to blank the thrust disc and impart to the latter its concavity. To give an example in this connection without intending any limitation, thrust discs were blanked from nylon sheet stock of about .016" thickness directly into bushing recesses of .075" diameter with punches the diameters of which were from .005" to .006" smaller than the diameters of the bushing recesses, and the thrust discs had pronounced concavity similarly as shown in FIGS. 1 and 4.

While in the described disc-blanking operation the thrust disc is blanked into an enlarged lubricant-reservoir recess in the bushing element, it is, of course, fully within the purview of the present invention to blank a thrust disc directly into a journal aperture of uniform diameter throughout in an element lacking a lubricant reservoir. Further, while the described exemplary drive component 42 has, besides the lubricated journal element 28, a lubricant-reservoir plugging element of pinion form, the latter element may obviously be in the form of a mere plug for the lubricant reservoir, with or without vent provisions, in cases where the reservoir-plugging element of a drive component is to perform no further function. Also, while in the described disc-blanking operation the punch is used solely as such and retracted from each bushing element after blanking a thrust disc thereinto, it is also fully within the purview of the present invention to use, in lieu of such punch, a plug as just mentioned, for example, which on its drive into permanent attachment with the recess in the bushing element cooperates with this recess in blanking a thrust disc directly into the latter.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range range of the appended claims are intended to be embraced therein.

What is claimed is:

1. A method of providing a thrust bearing in a metal element with a through-passage forming an aperture with an enlarged lubricant-reservoir end for the journal support of the element on a shaft stub and its bearing lubrication from the reservoir, which includes, blanking from sheet bearing stock a thrust disc directly into the element by placing the stock against the enlarged passage end in covering relation therewith and forcing through the stock and into the enlarged die-serving passage end an aligned blanking punch of a cross-section which in part conforms to, and in part deviates from, that of the enlarged passage end so as to leave local breathing clearance between the peripheral wall of the enlarged passage end and the blanked thrust disc therein.

2. A method of providing a thrust bearing in a metal element with a through-passage forming an aperture with an enlarged lubricant-reservoir end for the journal support of the element on a shaft stub and its bearing lubrication from the reservoir, which comprises, blanking from sheet bearing stock a thrust disc directly into the element by placing the stock against the enlarged passage end in covering relation therewith and forcing through the stock and into the enlarged die-serving passage end an aligned blanking punch of a cross-section which in part conforms to, and in part deviates from, that of the enlarged passage end so as to leave local breathing clearance between the peripheral wall of the enlarged passage end and the blanked thrust disc therein; and after retraction of the punch from the element applying a vented plug to the enlarged passage end to a depth at which adequate reservoir space is maintained.

3. A method of providing a thrust bearing in a metal element with a through-passage forming an aperture with an enlarged lubricant-reservoir end for the journal support of the element on a shaft stub and its bearing lubrication from the reservoir, which includes, blanking from sheet bearing stock a thrust disc directly into the element by placing the stock against the enlarged passage end in covering relation therewith and forcing through the stock and into the enlarged die-serving passage end an aligned blanking punch with sufficient clearance from the peripheral wall of the enlarged passage end to impart concavity to the blanked disc.

4. A method of assembling coaxial elements of a drive component and providing a thrust bearing therefor, of which one metal element has a through-passage forming an aperture with an enlarged lubricant-reservoir end for the journal support of the drive component on a shaft stub and for its bearing lubrication from the reservoir, and the other element has a hub formation for pressfit in the enlarged passage end of said one element, which comprises, blanking from sheet bearing stock a thrust disc directly into said one element by placing the stock against the enlarged passage end in covering relation therewith and forcing through the stock and into the enlarged die-serving passage end an aligned blanking punch; and after retraction of the punch from said one element pressing the hub formation of the other element into the enlarged passage end of said one element to a depth at which adequate reservoir space is maintained.

5. The method set forth in claim 4, which further comprises, locating the blanked thrust disc in the enlarged passage end in engagement with the pressed-in hub formation by placing the drive component onto its shaft stub in complete journal support relation therewith.

6. The method set forth in claim 4, in which said other element is a pinion with said hub formation being a cross-sectionally reduced part thereof and the gaps between the pinion teeth extending into said hub formation throughout its axial extent, and said blanking punch is of a cross-section which in part conforms to, and in part deviates from, that of the enlarged passage end so as to leave local breathing clearance between the peripheral wall of the enlarged passage end and the blanked thrust disc therein.

References Cited by the Examiner

UNITED STATES PATENTS

| | | | |
|---|---|---|---|
| 978,597 | 12/1910 | Kennedy | 29—525 |
| 1,630,715 | 5/1927 | Nice | 29—149.5 |
| 1,720,791 | 7/1929 | Johnson | 29—149.5 |
| 1,892,180 | 12/1932 | Stockfleth | 29—149.5 |
| 2,306,233 | 12/1942 | Smith | 29—525 |
| 2,332,445 | 10/1943 | Grim | 29—208 |
| 2,490,594 | 12/1949 | Madden | 29—525 |
| 3,130,489 | 4/1964 | Schlage | 29—432 |

FOREIGN PATENTS 924,925  3/1955  Germany.

WHITMORE A. WILTZ, *Primary Examiner.*

THOMAS H. EAGER, *Examiner.*